(12) United States Patent
Bushee

(10) Patent No.: US 11,737,449 B1
(45) Date of Patent: Aug. 29, 2023

(54) INSECT REPELLING LIGHTING SYSTEM

(71) Applicant: Glenn C Bushee, Duxbury, MA (US)

(72) Inventor: Glenn C Bushee, Duxbury, MA (US)

(*) Notice: Subject to any disclaimer, the term of this patent is extended or adjusted under 35 U.S.C. 154(b) by 0 days.

(21) Appl. No.: 17/555,063

(22) Filed: Dec. 17, 2021

Related U.S. Application Data

(60) Provisional application No. 63/258,341, filed on Apr. 26, 2021.

(51) Int. Cl.
*A01M 29/10* (2011.01)

(52) U.S. Cl.
CPC .................... *A01M 29/10* (2013.01)

(58) Field of Classification Search
CPC ... A01M 29/10; F21V 21/084; F21V 33/0008
See application file for complete search history.

(56) References Cited

U.S. PATENT DOCUMENTS

| 2007/0206375 A1* | 9/2007 | Piepgras | F21S 8/00 |
| | | | 362/147 |
| 2013/0201672 A1* | 8/2013 | Bushee | F21V 15/04 |
| 2019/0099613 A1* | 4/2019 | Estes | A61N 5/06 |
| 2021/0195732 A1* | 6/2021 | Longinotti-Buitoni | |
| | | | H05K 1/02 |
| 2021/0337671 A1* | 10/2021 | Ibrahim Kani | H05K 1/18 |

OTHER PUBLICATIONS

Author: Bryan Clark, Title: Light Barrier Used to Repel Mosquitoes, Publication: New Atlas, Nov. 13, 2011, downloaded from: newatlas.com/light-wall-repel-mosquitoes/20448/.

* cited by examiner

*Primary Examiner* — Joshua J Michener
*Assistant Examiner* — Henry Hooper Mudd
(74) *Attorney, Agent, or Firm* — Lawrence Shurupoff

(57) ABSTRACT

The combination of infrared light, ultraviolet light and near ultraviolet or blue light has been found to repel insects, and particularly flying insects. Electric lights powered by batteries, solar cells or line voltage are arranged in mutual proximity on virtually any desired substrate to repel insects and prevent insects from closely approaching and landing around the substrate. In one example, the substrate can take the form of an article of clothing, such as a hat.

4 Claims, 1 Drawing Sheet

INSECT REPELLING LIGHTING SYSTEM

BACKGROUND AND SUMMARY

An electrically-powered lighting system has been developed for repelling insects by creating a three dimensional region of light having a combination of specific light wavelengths. A combination of infrared (IR) light, ultraviolet (UV) light and near UV light referred to as "blue" light has been found to produce an effective barrier against the entry of insects.

This lighting system has been found to be particularly effective in repelling flying insects such as mosquitoes, flies and gnats, including black flies, deer flies and brown flies in both daylight and in the dark.

The unpleasant and potentially harmful effects of chemical insect repellants typically applied to the skin and clothing are avoided with the lighting system described herein. Unpleasant odors, stained clothing and unpleasant skin contact associated with chemical repellants are further avoided with the use of insect repelling light.

A three dimensional region of artificially produced and electrically-powered light with specific wavelengths produces a barrier of light virtually invisible or barely visible to humans but detectable by insects. The barrier of light is particularly effective against flying insects, as it prevents the insects from entering the region of light. When the region of light is located adjacent to a living subject, such as an animal or human, insects, and particularly flying insects, are repelled and prevented from landing on and biting the living subject.

Use of the lighting system described herein can reduce or prevent the spread of insect-borne and insect-transmitted diseases such as malaria, EEE and West Nile virus.

In one embodiment, a set of individual discrete lighting units is provided in the form of low cost, rugged, compact, lightweight, shock resistant and waterproof battery-powered light-emitting diodes (LEDs). The LEDs can be packaged in clear waterproof plastic pouches with adhesive backing and applied to virtually any substrate, such as an article of clothing including hats, shirts, jackets and shoes.

Examples of such battery-powered LEDs are described in U.S. Pat. Nos. 9,013,100; 9,030,085; 9,206,969 and 9,441,832, each of which is incorporated herein by reference in its entirety. The LEDs can be solar powered as described in U.S. Pat. No. 9,206,969, as well as rechargeable.

An insect-repelling region can also be produced with lighting other than with battery powered LEDs. For example, an insect-repelling region can be produced with electrically powered lighting powered by standard 110 volt or 220 volt alternating current (AC) household voltage.

While it is generally believed that UV light actually attracts flying insects, it has been found that by combining certain wavelengths of UV light with insect repelling IR light, the effectiveness in repelling flying insects over using IR light alone, actually increases. That is, in one example, by driving a closely-spaced pair of commercially available battery-powered UV and IR LEDs at a power level of about 0.33 watt each (about one third of a watt), the extent of effectiveness in repelling flying insects doubled from about six inches from the location of the IR LED light only, to about twelve inches from the location of the combination of the pair of adjacent UV and IR LEDs.

With the addition of blue light from a similarly powered blue light LED to the adjacent combination of UV and IR LED lights noted above, the extent of the three dimensional region of effectiveness in repelling flying insects increased by at least another six inches to a total of eighteen to twenty four inches. This level of effective insect repulsion is sufficient to prevent flying insects from closely approaching and landing on or around a person's neck and face when wearing a combination of these three LEDs on a hat or on another location near a person's head.

Of course, additional sets of these three LED's can be applied around the back of a person's head, such as around a shirt or jacket, to avoid flying insects landing on and biting the back of a person's neck and head.

By driving a combination of LEDs or other lighting at the combined wavelengths described herein, but at higher wattages, the extent of the three dimensional region of effective insect repulsion can be increased well beyond twenty four inches. For example, AC powered LEDs can be powered as individual units or provided in or on a common housing with a common power supply providing well more than a third of a watt to each LED or other form of lighting.

Various other objects, features and attendant advantages of the present disclosure will be more fully appreciated as the same becomes better understood from the following detailed description.

DETAILED DESCRIPTION

Figure 1:
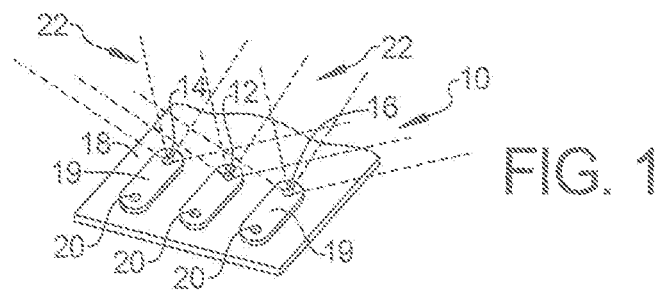
FIG. 1 is a schematic top perspective view of a set of three LEDs provided on a generic substrate and arranged in accordance with a representative embodiment of this disclosure.

A representative embodiment of an electrically-powered insect repelling system 10 is shown in FIG. 1. The system 10 includes a first LED 12 serving as a source of infrared or "IR" light, a second LED 14 serving as a source of ultraviolet or "UV" light and a third LED 16 serving as a source of near ultraviolet or "blue" light.

The three LEDs in this example are separate, discrete and individually battery powered. The LEDs are shown provided on a substrate 18 which generically represents virtually any surface around which it is desired to repel insects. The LEDs can be permanently fixed to the substrate 18 such as by permanent adhesive or removable from the substrate such as by a "peel off" backing including a weak adhesive or a hook and loop attachment.

Figure 2:
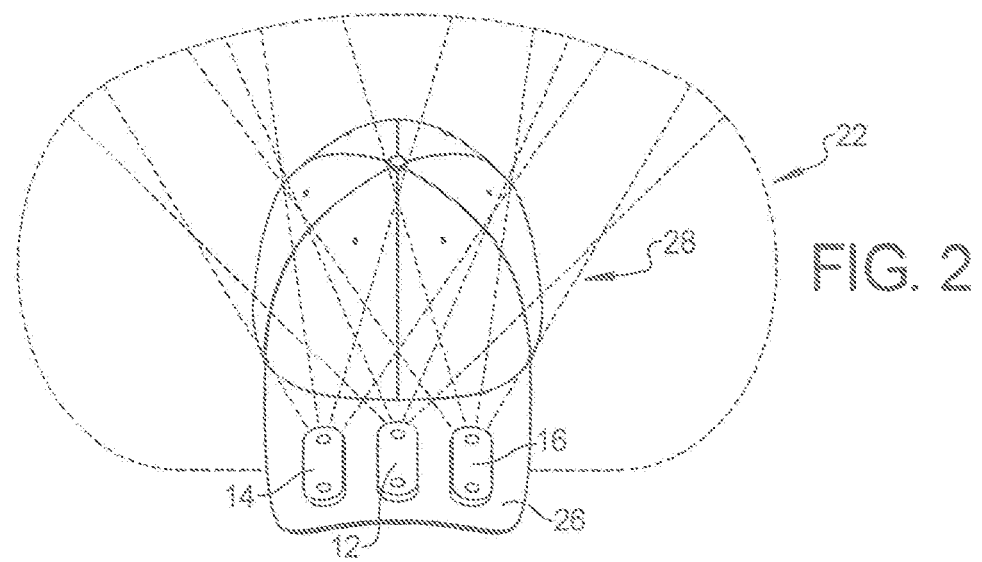
FIG. 2 is a front view of a baseball cap provided with a set of three LEDs such as those shown in FIG. 1 and arranged on the brim of the cap.
Figure 3:
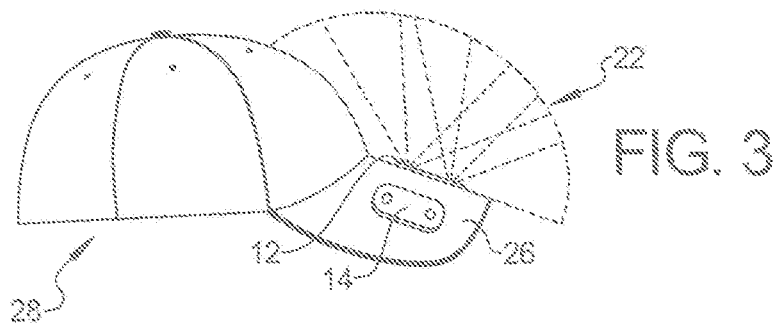
FIG. 3 is a side view of FIG. 2.

The three LEDs in FIG. 1 are shown arranged closely adjacent to one another or in mutual proximity to ensure that the light that they produce mixes and combines with each other as schematically represented in FIGS. 1, 2 and 3 by dashed linear lines. The lower the wattage driving the LEDs, the closer they should be arranged, such as within at least an inch or two at wattages below one watt. The three LEDs 12, 14, 16 can be arranged in any sequence or pattern as long as the light they produce combines sufficiently to repel insects over a desired distance.

In the example of FIG. 1, each LED can be constructed as a miniature discrete, self-contained battery and lighting unit such as described in detail in the US patents incorporated herein above. For example each LED 12, 14, 16 can be connected to a switching circuit on a miniature circuit board 19.

A manually-operated button switch 20, when depressed, cycles the LED through a series of operating modes including a constant higher power bright "on" mode, a constant lower power dim "on" mode, a higher power strobed mode and an "off" mode. It has been found that operating the LEDs 12, 14, 16 in the strobed mode generally produces the most effective repulsion of flying insects.

The LEDs can be encapsulated in a clear waterproof plastic pouch having an adhesive backing covered with a removable peel-off cover similar to those found on adhesive bandages. These LEDs 12, 14, 16 are commercially available from Brite-Strike Technologies, Inc. They can provide up to two hundred hours of lighting with a standard "button" battery, such as a 2032 battery.

While these miniature electrically-powered LEDs run on about one third of a watt and effectively repel flying insects over a three dimensional region extending from about at least six inches up to about two feet away from the LEDs, larger LEDs running at higher wattages can provide larger insect-repelling regions at the respective wavelengths described herein.

The substrate 18 in FIG. 1 can take the form of an article of clothing or any surface around which it is desired to repel insects, particularly flying insects. For example, substrate 18 can represent a portion of an outdoor tent door, a cover or other surface on a baby stroller, a backpack, a portion of a patio screen, etc.

By arranging the LEDs 12, 14, 16 as shown in FIG. 1, and by activating or turning on the three LEDs with button switches 20, a volume of space or "region" of space 22 surrounding the surface of the substrate 18 is radiated with a combination of IR light, UV light and near UV light or blue light. An effective range of wavelengths for repelling insects such as flying insects, is about 790 nanometers (nm) to about 800 nm with IR light, about 390 nm to about 395 nm with UV light, and about 440 nm to about 470 nm with blue light. These wavelength ranges can still be effective even if increased or decreased by several nanometers.

As further seen in FIG. 1, the insect repelling region of light 22 is created by combining light from each LED 12, 14, 16 within the wavelength ranges listed above. Of course, more than one of each LED 12, 14, 16 can be applied to provide a larger insect repelling region 22.

Another example of a representative application of the insect-repelling system 10 is shown in FIG. 2 and FIG. 3. The LEDs 12, 14, 16 can be adhesively applied to the top and/or underside of a brim 26 of a hat, such as a baseball cap 28. When the LEDs are activated, an insect-repelling region 22, schematically represented by curved dashed lines, is produced around the front and sides of the baseball cap 28. This arrangement has been shown to prevent flying insects from landing around the face and the front and sides of the neck of a person wearing the baseball cap 28.

One or more additional sets of LEDs 12, 14, 16 can be applied to the top, sides or back of the baseball cap 28 or around the sides or back of a shirt collar to prevent flying insects from landing around the back of a person's head and neck. However, depending on the intensity of the flying insects, application of the insect-repelling system 10 to only the brim 26 or only to the top of a hat can repel insects from the front, sides and back of a person's head and neck.

Figure 4:
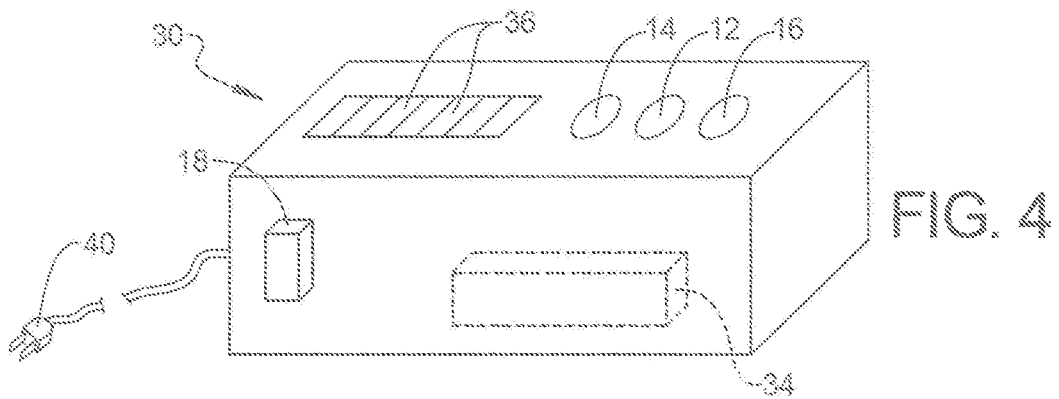
FIG. 4 is a schematic front perspective view of a stand-alone or discrete insect repelling unit powered by battery power, AC power or a combination of any two or more power sources, including solar power.

FIG. 4 shows an integral stand-alone insect-repelling system 10 provided with three LEDs 12, 14, 16. The unit includes a housing 30 on or in which the LEDs are housed and supported. This system 10 can be powered by a battery 34, solar cells 36 or by 110 or 220 line voltage via power cord 40. A switch 18 is provided to cycle through a series of operating modes and select a simultaneous operating mode for all LEDs, including an on, off, high light intensity, low light intensity and high strobe intensity.

A series of stand-alone systems 10, such as the system shown in FIG. 4, can be spaced around the border or perimeter of an area or space to form a barrier in the manner of a screened enclosure to prevent the entry of flying insects. For example, the stand-alone systems 10 can be placed around an outdoor picnic table as well as on the picnic table to keep flying insects away from food, drink, pets and people without the use of chemical foggers or pungent citronella.

Other variations are within the spirit of the present invention. Thus, while the invention is susceptible to various modifications and alternative constructions, certain embodiments thereof have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims. For example, the lighting system 10 can be used without blue light. That is, a lighting system 10 can be used with only IV and IR light, such as LEDs 12 and 14. However, without blue light the system is less effective in repelling insects.

What is claimed is:

1. A method of repelling insects, comprising:
   providing a source of IR light, a source of UV light and a source of blue light each powered by a battery;
   providing a releasable attachment portion on each of said sources of IR light, UV light and blue light:
   producing said IR light with said source of IR light;
   producing said UV light with said source of UV light;
   producing said blue light with said source of said blue light;
   combining said IR light, said UV light and said blue light;
   driving said sources of IR light, UV light and blue light at a power level of about one-third watt or more;
   producing a region of insect-repelling light by said combining said IR light, said UV light and said blue light;
   releasably attaching said sources of IR light, UV light and blue light to a substrate with each respective attachment portion; and
   repelling insects over a distance of at least about six inches with said region of insect-repelling light.

2. The method of claim 1, further comprising strobing at least one of said IR light, said UV light and said blue light.

3. The method of claim 1, further comprising producing said IR light with a wavelength of about 790 nm to about 800 nm, producing said UV light with a wavelength of about 390 nm to about 395 nm, and producing said blue light with a wavelength of about 440 nm to about 470 nm.

4. The method of claim 1, further comprising providing a manual switch on each of said sources of IR light, UV light and blue light, and wherein said method further comprises switching said sources of IR light, UV light and blue light on and off with each said manual switch.

\* \* \* \* \*